(12) United States Patent
Masuko et al.

(10) Patent No.: US 8,811,734 B2
(45) Date of Patent: Aug. 19, 2014

(54) COLOR DETERMINATION DEVICE, COLOR DETERMINATION SYSTEM, COLOR DETERMINATION METHOD, INFORMATION RECORDING MEDIUM, AND PROGRAM

(75) Inventors: Soh Masuko, Shinagawa-ku (JP); Satoshi Sekine, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/235,515

(22) PCT Filed: Aug. 1, 2012

(86) PCT No.: PCT/JP2012/069564
§ 371 (c)(1), (2), (4) Date: Jan. 28, 2014

(87) PCT Pub. No.: WO2013/021888
PCT Pub. Date: Feb. 14, 2013

(65) Prior Publication Data
US 2014/0153821 A1 Jun. 5, 2014

(30) Foreign Application Priority Data
Aug. 5, 2011 (JP) ................................ 2011-172210

(51) Int. Cl.
*G06K 9/00* (2006.01)
(52) U.S. Cl.
USPC ........................................................ 382/165
(58) Field of Classification Search
None
See application file for complete search history.

(56) References Cited

U.S. PATENT DOCUMENTS

| 6,891,639 | B1 * | 5/2005 | Nabeshima et al. | 358/1.9 |
| 7,705,856 | B2 * | 4/2010 | Tanaka et al. | 345/593 |
| 2002/0054706 | A1 * | 5/2002 | Nakatsuka | 382/165 |
| 2002/0081024 | A1 * | 6/2002 | Park et al. | 382/165 |
| 2008/0044081 | A1 * | 2/2008 | Lieb | 382/162 |
| 2011/0235902 | A1 * | 9/2011 | Chittar et al. | 382/162 |
| 2012/0195499 | A1 * | 8/2012 | Hosomi | 382/162 |

FOREIGN PATENT DOCUMENTS

JP 2001-069362 A 3/2001

OTHER PUBLICATIONS

International Search Report of PCT/JP2012/069564 dated Sep. 4, 2012.

* cited by examiner

*Primary Examiner* — Sean Motsinger
(74) *Attorney, Agent, or Firm* — Sughrue Mion, PLLC

(57) ABSTRACT

In a color determination device (101) that determines a correspondence relationship between a character string indicating a color and the color indicated by the character string, a character string receiver (102) receives input of a character string; an image retriever (103) retrieves for an image relating to the received character string and obtains a plurality of images as a result of the image retrieval; a degree acquirer (104) represents, with a predetermined accuracy, colors appearing in the plurality of respective images and acquires degrees at which the colors represented with the predetermined accuracy appear in the plurality of images; and a color determiner (105) determines a color indicated by the received character string from the colors represented with the predetermined accuracy on the basis of the acquired degrees.

13 Claims, 17 Drawing Sheets

FIG. 9C

COLOR DETERMINATION DEVICE, COLOR DETERMINATION SYSTEM, COLOR DETERMINATION METHOD, INFORMATION RECORDING MEDIUM, AND PROGRAM

CROSS REFERENCE TO RELATED APPLICATIONS

This is a National Stage of International Application No. PCT/JP2012/069564 filed Aug. 1, 2012, claiming priority based on Japanese Patent Application No. 2011-172210 filed Aug. 5, 2011, the contents of all of which are incorporated herein by reference in their entirety.

TECHNICAL FIELD

The present invention relates to a color determination device, a color determination system, a color determination method, an information recording medium, and a program, and determines, from a character string indicating a color, the color being indicated by the character string.

BACKGROUND ART

The arts have conventionally proposed converting colors to data in a standard color space thereby to improve color reproducibility. For example, Patent Literature 1 discloses an art that converts an individual color to data in an RGB (Red, Green, Blue) color space, data in a CYMK (Cyan, Yellow, Magenta, Black) color space or the like thereby to improve color reproducibility.

In this way, systems for quantitatively expressing colors include RGB representation, CYMK representation, as well as HSV (Hue, Saturation/chroma, Value/brightness) representation and the like. Conversion of values among the respective systems is formulated.

In RGB representation, 24 bit color, in which a color is represented by 3 bytes, is widely used. In 24 bit color, any one of 0 to 255 is assigned to each component of R, G, B. In 15 bit color in which a color is represented by 2 bytes, any one of 0 to 31 is assigned to each component of R, G, B. By dividing the respective components of R, G, B in 24 bit color by 8, 24 bit color can be converted to 15 bit color.

In this way, accuracy (resolution) of color space relative to data representation will be properly selected. A color represented with a high accuracy will be converted to a color with a low accuracy although information of the color is decreased.

CITATION LIST

Patent Literature

Patent Literature 1: Unexamined Japanese Patent Application Kokai Publication No. 2001-069362

SUMMARY OF INVENTION

Technical Problem

However, when a person selects color, he/she usually uses a character string indicated by natural language, not by RGB representation or the like.

Even if a color name is decided on by a standard or the like, the color name that is used by a person in daily life varies depending on time and field in which the person plays a role. In addition, the person sometimes provides a new name for the color.

Therefore, there is a demand for properly determining a correspondence relationship between a color name and the color indicated by the color name.

The present invention solves the above problem and has an objective to provide a color determination device, a color determination system, a color determination method, an information recording medium and a program that are suitable for determining a correspondence relationship between a character string indicating a color and the color indicated by the character string.

Solution to Problem

A color determination device according to a first aspect of the present invention includes:
  a character string receiver that receives input of a character string;
  a degree acquirer that represents, with a predetermined accuracy, one or more colors appearing in each of a plurality of images obtained as a result of retrieving for an image relating to the received character string, and acquires a degree at which the on or more colors represented with the predetermined accuracy appear in each of the plurality of images; and
  a color determiner that determines a color indicated by the received character string on a basis of the acquired degree, from the one or more colors represented with the predetermined accuracy.

The color determination device according to the present invention should be configured such that
  the degree is a value indicating a number of image in which the one or more colors represented with the predetermined accuracy appear, among the plurality of images, and
  the color determiner extracts one or more colors having a highest degree from the one or more colors represented with the predetermined accuracy on a basis of the acquired degree, and determines a color indicated by the received character string on a basis of the extracted one or more colors.

The color determination device according to the present invention should be configured such that
  the color determiner determines that a color obtained by averaging the extracted one or more colors is a color indicated by the received character string.

The color determination device according to the present invention should be configured such that
  the degree is a frequency at which the one or more colors represented with the predetermined accuracy appear in each of the plurality of images, and
  the color determiner extracts, on a basis of the acquired degree, one or more colors represented with the predetermined accuracy having a higher total number of the frequency in appearing in each of the plurality of images, and determines a color indicated by the received character string from the one or more extracted colors.

The color determination device according to the present invention should be configured such that
  the color determiner determines that a color obtained by averaging the one or more extracted colors using a total number of frequency of the one or more extracted colors as weights is a color indicated by the received character string.

The color determination device according to the present invention should be configured such that
  the degree acquirer removes, for each of the plurality images, a pixel having the same color as the pixel at a corner of the image from a peripheral boarder of the image, and then represents a color appearing in the image with the predetermined accuracy.

The color determination device according to the present invention should be configured
to further include an image retriever to retrieve for an image relating to the received character string, and
such that the degree acquirer acquires the degree from the plurality of images obtained as a result of image retrieval by the image retriever.

The color determination device according to the present invention should be configured such that
the color determiner clusters the acquired degree thereby to determine that a representative color of each cluster is a color indicated by the received character string.

The color determination device according to the present invention should be configured
to further include an image retriever that transmits an image retrieval request containing a query to specify the received character string to an external image retrieval device communicably connected to the color determination device, receives an image retrieval response in response to the image retrieval request from the image retrieval device, and obtains a plurality of images specified in the image retrieval response as a result of image retrieval, and
such that the degree acquirer acquires the degree from the plurality of images obtained as the result of the image retrieval by the image retriever.

The color determination device according to the present invention may be configured such that
the image retriever specifies, as the query, a character string meaning color in the language of the received character string, and the received character string.

The color determination device according to the present invention may be configured such that
the received character string is a character string describing a color of a product,
the determined color is a representative color of the product, and
the color determiner determines that, among predetermined reference colors, a reference color that is most similar to the representative color of the product is a classification color of the product.

A color determination system according to a second aspect of the present invention includes:
an image retrieval device that, on receiving an image retrieval request containing a query to specify a character string, retrieves for an image that conforms to the query, and transmits an image retrieval response that specifies a plurality of images obtained by the image retrieval; and a color determination device communicably connected to the image retrieval device, the color determination device including:
a character string receiver that receives input of a character string;
an image retriever that transmits an image retrieval request containing a query to specify the received character string to the image retrieval device, receives an image retrieval response in response to the image retrieval request from the image retrieval device, and obtains a plurality of images specified in the image retrieval response as the image retrieval;
a degree acquirer that represents one or more colors, with a predetermined accuracy, that appear in each of the plurality of images obtained as a result of the image retrieval, and acquires a degree at which the one or more colors represented with the predetermined accuracy appear in each of the plurality of images; and
a color determiner that determines a color indicated by the received character string on a basis of the acquired degree, from the one or more colors represented with the predetermined accuracy.

A color determination method according to a third aspect of the present invention includes:
a character string receiving step to receive input of a character string;
a degree acquisition step to represent with a predetermined accuracy, one or more colors that appear in each of a plurality of images obtained as a result of retrieving for an image relating to the received character string, and to acquire a degree at which the one or more colors represented with the predetermined accuracy appear in each of the plurality of images; and
a color determination step to determine a color indicated by the received character string on a basis of the acquired degree, from the one or more colors represented with the predetermined accuracy.

A computer-readable information recording medium according to a fourth aspect of the present invention that has stored a program, the program causing a computer to function as:
a character string receiver that receives input of a character string;
a degree acquirer that represents, with a predetermined accuracy, one or more colors appearing in each of a plurality of images obtained as a result of retrieving for an image relating to the received character string, and acquires a degree at which the one or more colors represented with the predetermined accuracy appear in each of the plurality of images; and
a color determiner that determines a color indicated by the received character string on a basis of the acquired degree, from the one or more colors represented with the predetermined accuracy.

A program according to a fifth aspect of the present invention causes a computer to function as:
a character string receiver that receives input of a character string;
a degree acquirer that represents, with a predetermined accuracy, one or more colors that appear in each of a plurality of images obtained as a result of retrieving for an image relating to the received character string, and acquires a degree at which the one or more colors represented with the predetermined accuracy appear in each of the plurality of images; and
a color determiner that determines a color indicated by the received character string on a basis of the acquired degree, from the one or more colors represented with the predetermined accuracy.

It is possible to record the program according to the present invention in a computer-readable, non-transitory information recording medium such as a compact disk, a flexible disk, a hard disk, a magnet-optical disk, a digital video disk, a magnetic tape, or a semiconductor memory. This information recording medium is possibly distributed and sold, separately from a computer.

It is also possible to distribute and sell the program via a transmission medium such as a computer network, separately from the computer on which the program is executed.

Advantageous Effects of Invention

The present invention provides a color determination device, a color determination system, a color determination method, an information recording medium, and a program that are suitable for determining a correspondence relationship between a character string indicating a color and the color indicated by the character string.

BRIEF DESCRIPTION OF DRAWINGS

FIG. 9C is a diagram illustrating an example in which a product registration form is displayed on the screen of a terminal device;

DESCRIPTION OF EMBODIMENTS

Figure 1:
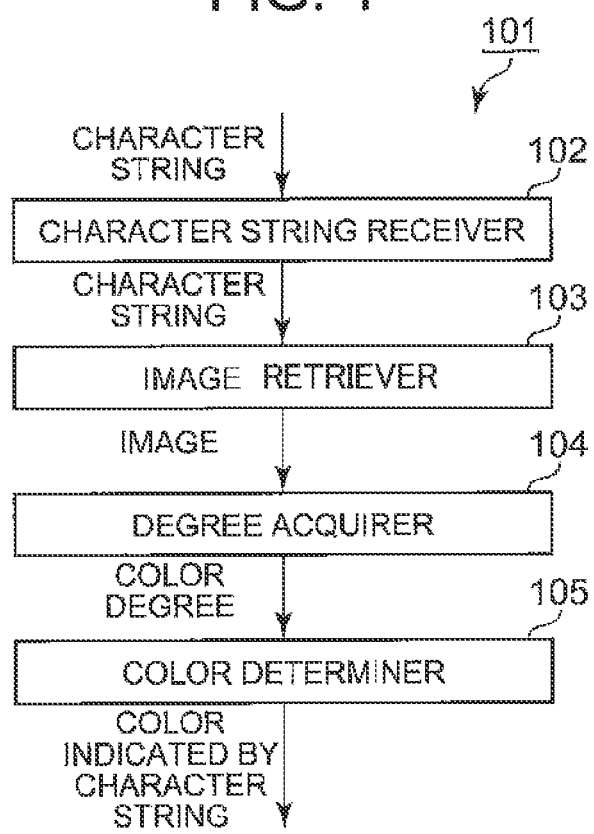
FIG. 1 is a diagram illustrating a schematic configuration of a color determination device.

Hereinafter, embodiments of the present invention will be described. The present embodiments are for explaining the present invention, not for limiting the scope of the present invention. Accordingly, it is possible for a person skilled in the art to employ embodiments in which part or all of the elements of these embodiments are replaced by equivalents thereof, which are also included in the scope of the present invention.

(Sameness and Similarity of Colors)

As described above, as systems for quantitatively expressing colors, various color spaces are defined such as RGB, CYMK and HSV, and conversion among these color spaces is formulated. Hereinafter, for easier understanding, the embodiments will be described using RGB representation, but it is also possible to employ other representation such as CYMK and HSV.

In RGB representation, each color is represented using three values of R, G, B. That is, each color is represented by a point or a position vector that is disposed within a three-dimensional color space composed of R axis, G axis and B axis. HSV is represented in a three-dimensional color space. CYMK has a four-dimensional color space.

Accordingly, sameness and similarity between a color and another color can be determined using a distance in the color space. That is, the distance between two colors is set by summation of absolute values of differences between respective components (Manhattan distance), the square root of the square sum of differences between respective components (Euclidean distance) or the like, and it is determined in such a way that if this distance is 0, the two colors are the same, and if this distance is less than a certain threshold value, the two colors are similar.

Human retinal sensitivities vary depending on R, G, B components, and the retina identifies G component with a higher sensitivity. Therefore, in finding the aforementioned distance, a method may be employed in which respective absolute values or squares of differences are multiplied by a coefficient and then are summed up so that the weight of G component is high.

Similarly, when a person determines similarity of colors, hue and saturation sometimes take priority over brightness. Therefore, if the distance between colors is found using the difference between their respective components by Manhattan distance, Euclidean distance or the like in an HSV color space, a method may be employed in which respective absolute values or squares of differences are multiplied by a coefficient and then are summed up so that the weight of brightness is lower.

(Document Retrieval, Image Retrieval)

Retrieval technologies are conventionally provided for retrieving various documents that are used in various web pages publicized in a computer communication network such as the Internet, in a personal computer or in an in-house LAN (Local Area Network), and various web retrieval engines and desktop retrieval engines are provided.

In an application technology of document retrieval, a user usually accesses a retrieval engine via a browser or a dedicated application to provide a query specifying a character string to be retrieved for. Then, the retrieval engine retrieves the entire web, the LAN or the computer, and returns a document relating to the character string as the retrieval result.

Image retrieval technologies include a technology to retrieve for images using a character string as a query. This is based on the empirical rule that a document having an image therein often has a character string describing the image near the image. Therefore, it is possible to use the same retrieval technology as the aforementioned document retrieval.

There is also an image retrieval technology in which when a color is specified, an image containing the color is retrieved for. In this technology, for an image to be retrieved, one or a predetermined number of representative colors in the image are previously selected on the basis of color distribution of pixels contained in the image. Then, degrees of similarity between a color specified by a user and the one or more representative colors of the image are determined as described above, thereby obtaining an image relating to a desired color as a retrieval result.

In many of these retrieval technologies, scores indicating how much respective retrieval results conform to a query are calculated employing various degrees of similarity, and the retrieval results are presented in descending order of the scores. Accordingly, it is common that a predetermined number of retrieval results with higher scores are used without using all the retrieval results satisfying a query.

Hereinafter, embodiments will be described with examples in the following order.

(1) Color determination device that receives a character string and determines the color indicated by the character string
(2) Color name determination device that receives a color and determines a character string indicating the color (name of the color, that is, color name)
(3) Example of application of the above (1) and (2) to a product color If one character string is given to the color determination device according to the present embodiment, it is possible to determine only one color or a plurality of candidate colors as determination results.

If one color is given to the color name determination device according to the present embodiment, one character string may be determined as a color name or a plurality of character strings will be determined as color name candidates.

These color determination device and color name determination device are typically realized in such a way that a predetermined program is executed on various types of computers such as a personal computer and a computer for a web server.

Here, a computer is the hardware in which a CPU (Central Processing Unit) executes a program thereby to use a RAM (Random Access Memory) as a temporary storage area and an output destination of the result of processing, to receive an instruction from a user via an input device such as a key board and a mouse, to output the result of processing to an output device such as a display, and to communicate with other devices via an NIC (Network Interface Card) to perform the aforementioned input and output. It is possible not to use the devices for input and output according to certain circumstances.

Alternatively, these color determination device and color name determination device will be realized in such a way that a design of an electronic circuit is created from a program by applying a technology such as an FPGA (Field Programmable Gate Array), and a dedicated electronic circuit is constructed on the basis of the design.

First Embodiment

The present embodiment relates to a color determination technology to determine, from a character string that is considered by a user to indicate a color, the color indicated by the character string. Here, a string composed of one letter (for example, "赤", "黄", "緑") will be a character string whose length is 1.

Figure 2:
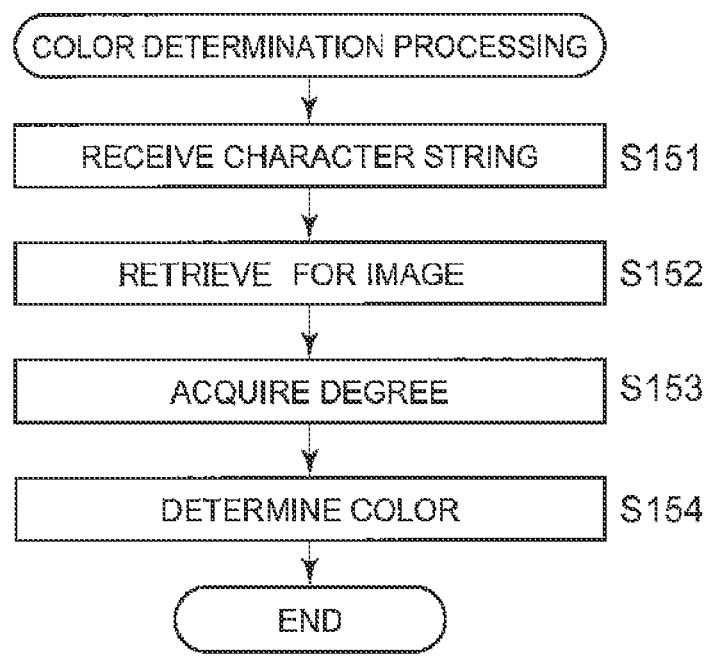
FIG. 2 is a flow chart illustrating color determination processing that is performed by the color determination device.

FIG. 1 is a diagram illustrating a schematic configuration of a color determination device according to the present embodiment. FIG. 2 is a flow chart illustrating color determination processing performed by the color determination device. Hereinafter, the embodiment will be described with reference to these FIGS.

As illustrated in FIG. 1, a color determination device 101 includes a character string receiver 102, an image retriever 103, a degree acquirer 104 and a color determiner 105.

These components are typically realized in such a way that the program is executed in a computer, as described above.

Once the color determination device 101 starts color determination processing, the character string receiver 102 first receives input of a character string (step S151).

A character string to be received by the character string receiver 102 is supposed to be a character string that is inputted by a user or a device other than the device 101 (In the aftermentioned color name determination device, a specific element of the device gives a character string to the character string receiver 102) and is a color name indicating a color. As such a character string indicating a color name, various color names are possibly employed depending on the area, the industry and the period, and manufacturers and shops themselves sometimes select color names or coin new color names.

Accordingly, the character string receiver 102 can receive any character string.

Next, the image retriever 103 retrieves for an image relating to the received character string, and receives a plurality of images as a result of the image retrieval (step S152).

Here, the image retriever 103 uses the aforementioned image retrieval technology to retrieve for an image relating to the received character string.

Typically, an image to be retrieved for are open on the Internet, and are within web documents containing the received character string.

It is also possible for the image retriever 103 to use an external image retrieval device, as will be described later. If a computer realizing the color determination device 101 including the image retriever 103 functions as an image retrieval engine, the image retriever 103 does not need to communicate with an external computer.

That is, any image retrieval technology is applicable as long as based on a character string, an image relating to the character string will be obtained.

To the number of images as a retrieval result is usually set an upper limit.

Then, the degree acquirer 104 represents colors appearing in the plurality of respective images with a predetermined accuracy, and acquires degrees at which the colors represented with the predetermined accuracy appear in the plurality of respective images (step S153).

The images obtained as a result of image retrieval are supposed to contain pixels of a color indicated by the received character string. Therefore, the degree acquirer 104 acquires degrees of colors, that is, what colors and to what extent they are contained in the images obtained as a result of image re-retrieval.

Here, if the accuracy of colors of the images obtained as a result of image is too high, degrees of the colors will be too small. Therefore, the accuracy of colors is typically reduced, thereby acquiring degrees of a color and its similar colors together.

Many images that are being used these days are represented in 24 bit color. Accordingly, a color space represented in RGB are divided into 256×256×256 (about 17 million) segments. Meanwhile, the number of pixels of digital cameras that are currently being sold is usually less than the number of segments of the color space in 24 bit color although the number of pixels of some digital cameras is more than 10 million.

Therefore, in the present embodiment, the accuracy of colors is reduced and the color space is re-divided into the lesser number of segments. In a technical field to classify values, a technology is proposed in which then accuracy of colors is reduced thereby bringing together similar values, and the resulting respective segments are called "buckets".

For example, if the accuracy of colors is 15 bit color, the number of segments divided in the color space is 32×32×32 (about 30 thousand); and if the accuracy of colors is 12 bit color, the number of segments is 16×16×16 (about 4 thousand). At such a number of segments, it is possible to acquire degrees of colors appropriately.

It is possible to employ various methods, besides the above method, as a method to reduce the accuracy of colors, that is, a method to divide a color space. For example, a method can be employed in which a color space is divided into more segments in G axis direction in which a person has a more accurate perception of colors and in a bright region where a person has a more accurate perception of colors.

After such reduction of the accuracy of the colors, a degree of the color is acquired. As the degree, the followings can be used.

(1) Among the images of the retrieval result, the number of images in which the color appears
(2) Among pixels of the images of the retrieval result, the total number of pixels of the color
(3) Value of combination of the above (1) and (2), that is, a value that is set to be larger when the number of images containing the color appeared becomes larger and the total number of pixels of the color becomes larger.
(4) If a value of any of the above (1), (2), (3) is greater than or equal to a predetermined threshold value, the degree is the value or 1, and if a value of any of the above (1), (2), (3) is less than a predetermined threshold value, the degree is 0.

Details of this will be described later in another embodiment.

Lastly, the color determiner 105 determines a color indicated by the received character string on the basis of the acquired degrees from the colors represented with a predetermined accuracy, and terminates the color determination processing (step S154).

A color indicated by the received character string is determined on the basis of the degrees of colors. As a method for determining one color, the followings can be used.

(1) A color whose degree is the highest is determined to be a color indicated by the character string.
(2) If there are a plurality of colors whose degrees are the highest, the color that is the farthest from the origin in the color space is determined to be the color indicated by the character string. In RGB representation, the brightest color will be selected.
(3) If there are a plurality of colors whose degrees are the highest, an average color of the colors is determined to be the color indicated by the character string.
(4) A predetermined number of colors whose degrees are higher are selected and an average color of the colors is determined to be the color indicated by the character string.
(5) A weighted-average of colors is found using the degrees acquired for the respective colors as weights, and the weighted-average is determined to be the color indicated by the character string.

As a method for determining one or more colors, the following can be employed.

(1) One or more colors whose degrees are the highest are determined to be colors indicated by the character string.
(2) A predetermined number of colors whose degrees are higher are determined to be colors indicated by the character string.

Modes other than these will be described in embodiments below.

In this way, the color determination device 101 according to the present embodiment applies an image retrieval technology to a character string received from a user or the like, thereby suitably determining the color indicated by the character string from colors contained in obtained images.

Hereinafter, various modes such as preferred embodiments and their variations of the color determination device 101 will be described.

Second Embodiment

In the present embodiment, as degrees of colors in the above first embodiment, the numbers of images containing the colors are employed among images of a retrieval result.

Hereinafter, an example will be described in which an RGB color space divided into 10×10×10 segments is employed, "green color" is given as a character string indicating a color, and image retrieval is performed on documents in the Internet.

FIGS. 3A, 3B, 3C and 3D are diagrams illustrating distribution of colors appearing in images of a retrieval result. Hereinafter, the example will be described with reference to these FIGS.

In these FIGS, the origin of the color space is disposed at the lower center, R axis (Red) extends rightward from the origin, G axis (Green) extends leftward from the origin, and B axis (Blue) extends upward from the origin. Positions in the color space of colors appearing in images of a retrieval result are denoted by filled circles.

Figure 3A:
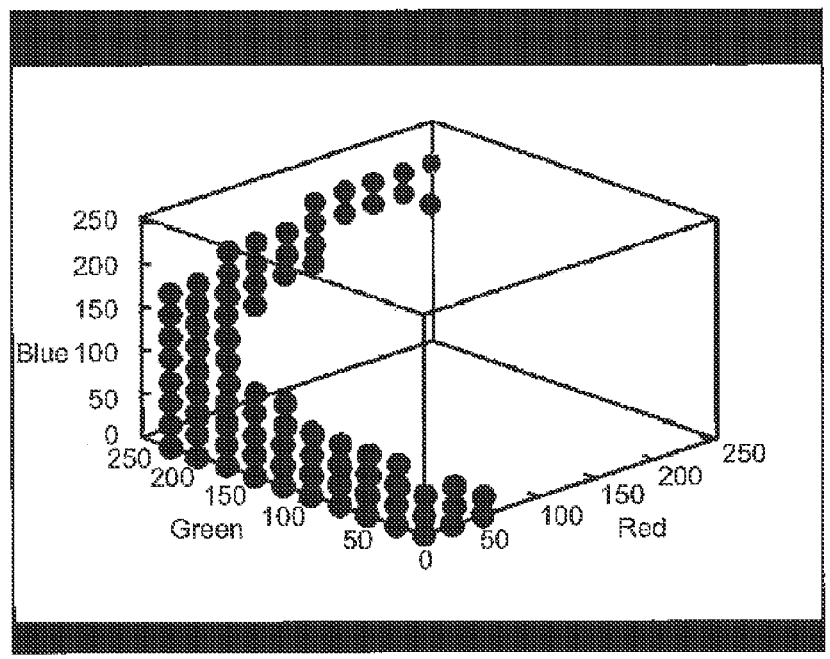
FIG. 3A is a diagram illustrating distribution of colors that appear in an image of a retrieval result.

Here, FIG. 3A illustrates distribution of colors appearing in the top one image of a retrieval result.

Figure 3B:
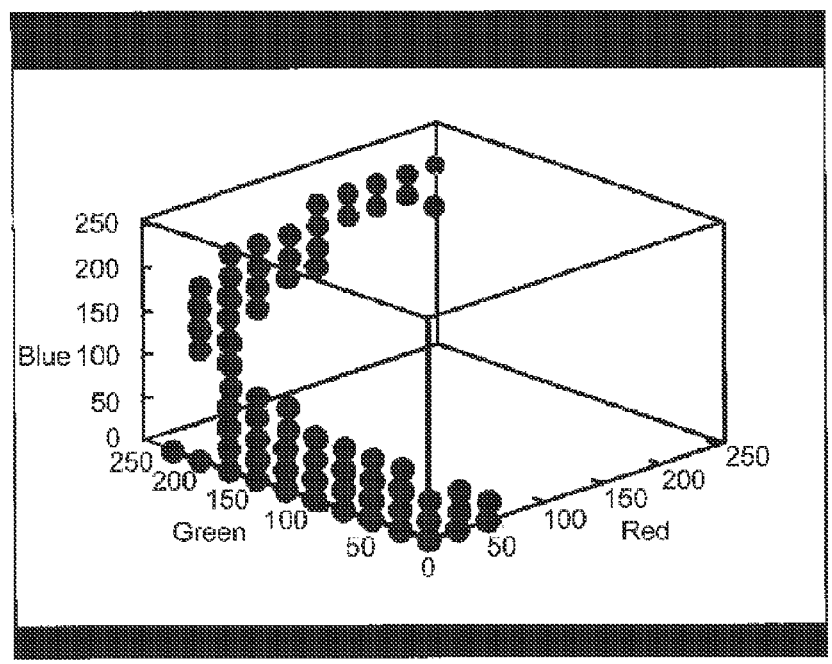
FIG. 3B is a diagram illustrating distribution of colors that appear in images of a retrieval result.

FIG. 3B illustrates distribution of colors appearing in common in the top two images of a retrieval result.

Figure 3C:
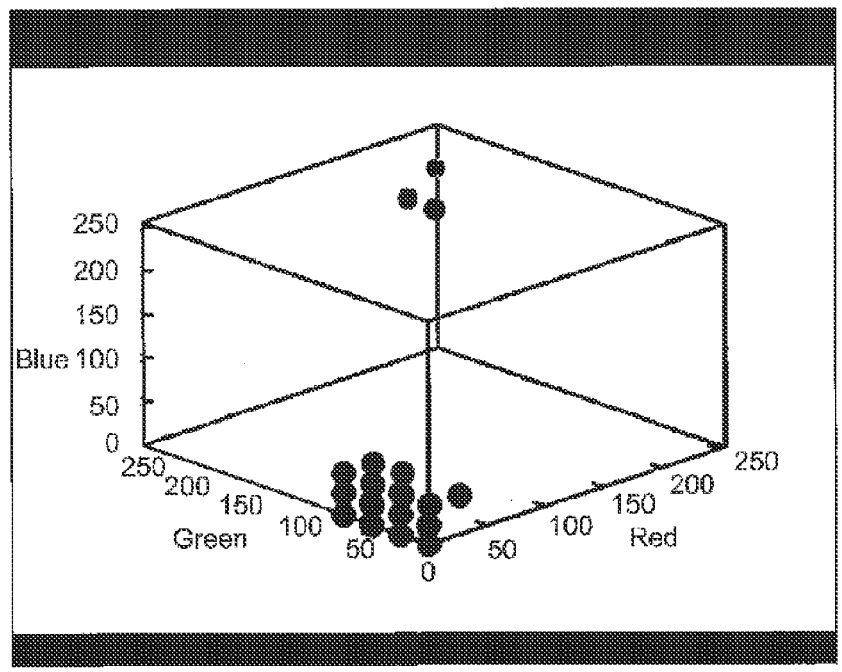
FIG. 3C is a diagram illustrating distribution of colors that appear in images of a retrieval result.

FIG. 3C illustrates distribution of colors appearing in common in all of the top three images of a retrieval result.

Figure 3D:
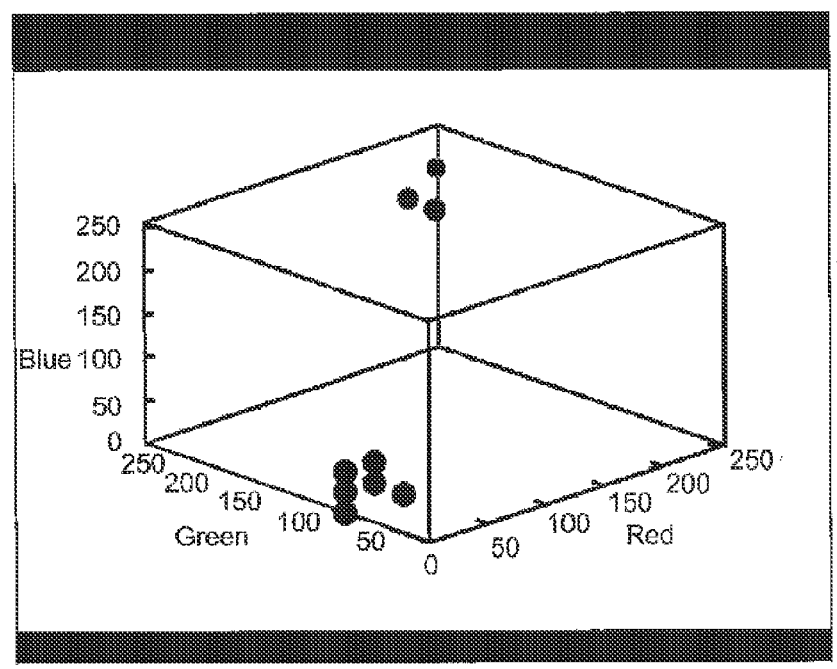
FIG. 3D is a diagram illustrating distribution of colors that appear in images of a retrieval result.

FIG. 3D illustrates distribution of colors appearing in common in all of the top four images.

Observing these FIGS. sequentially, as the number of images increases, distribution of colors gradually converges to near an end of G axis in the RGB color space.

Accordingly, by repeatedly increasing the number of images like one, two, three . . . , a color appearing in common in the top images of the retrieval result becomes apparent. This color is considered to be a color corresponding to the provided character string.

That is, every time the number of images is increased, the number of colors appearing in common is checked; and once the number becomes one, repetitions of the increase is stopped. Then, one remaining color is determined to be the color corresponding to the provided character string.

In any result of image retrieval, images are typically arranged in descending order of the score indicating a degree of conformance to the provided character string.

Therefore, if the retrieval result is N pieces of images, processing is repeated in such a way that distribution of colors appearing in the top one image is obtained, distribution of colors appearing in the two top images is obtained, distribution of colors appearing in the three top images is obtained, . . . , which is considered to converge at high speed.

If the retrieval result is N pieces of images and a plurality of colors whose degrees are N, that is, a plurality of colors appearing in all of the N pieces of images are obtained, all of the colors will be determined to be candidates of a color corresponding to the provided character string or an average color of the colors will be determined to be the color corresponding to the provided character string.

If the number of colors appearing in common becomes 0 in the middle of the repetitions, all or an average color of colors remaining before the last repetition will be determined to be colors or a color corresponding to the provided character string.

Figure 4:
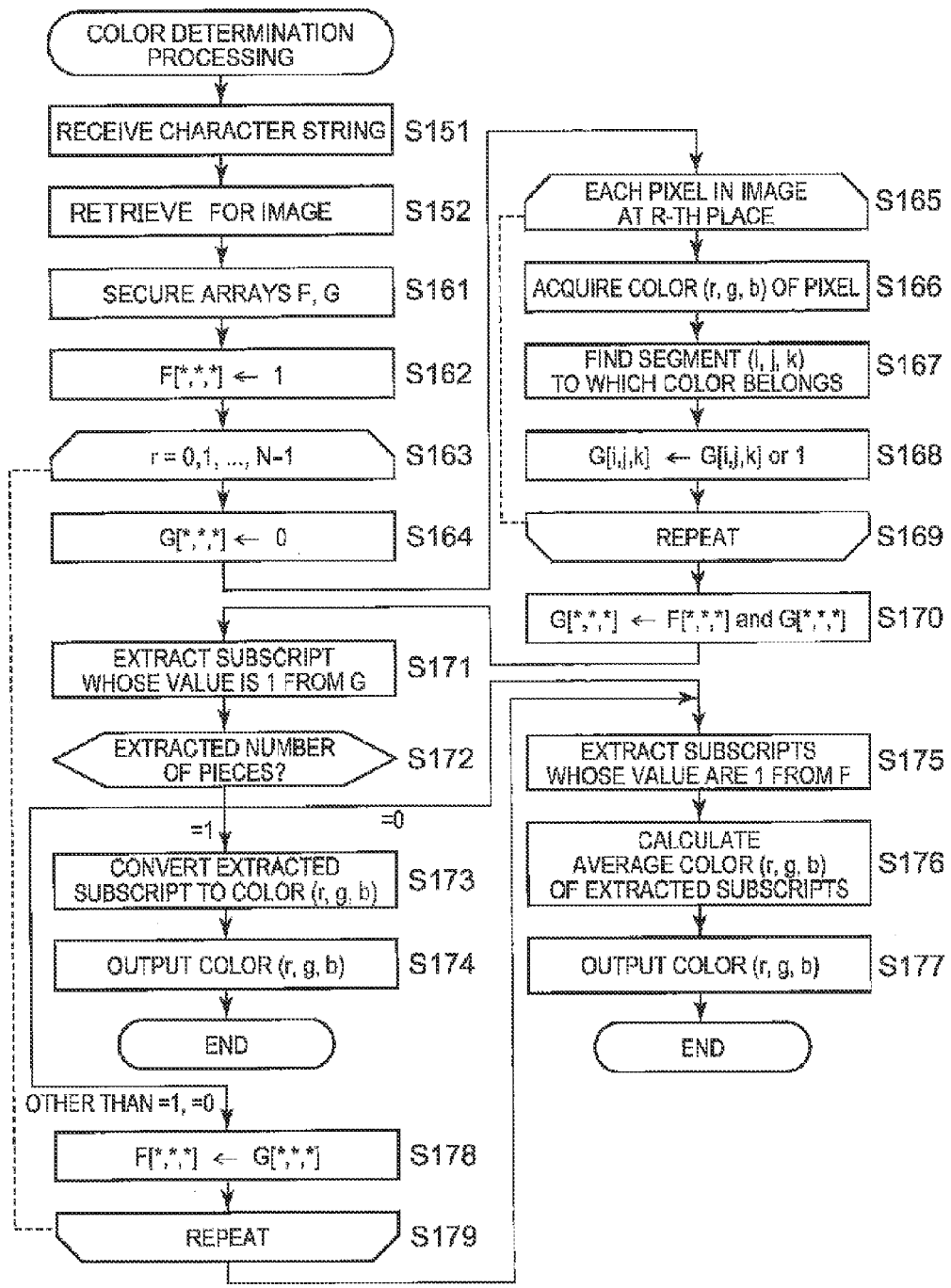
FIG. 4 is a flow chart illustrating control of color determination processing.

FIG. 4 is a flow chart illustrating control of color determination processing according to the present embodiment. Hereinafter, the present embodiment will be described with reference to FIG. 4. In this embodiment, one color is determined corresponding to a provided character string.

Once the color determination processing according to the present embodiment is started, a character string is received (step S151) and image retrieval is performed (step S152), like the above first embodiment. After that, the following processing is performed.

First, the CPU secures a three dimensional bit array F[-, -, -] and a three dimensional bit array G[-, -, -] in respective segments divided with a predetermined accuracy in the color space within the RAM (step S161).

If the color space is divided into M pieces in all of R axis, G axis and B axis and as a result the total number of segments are M×M×M, subscripts of the bit arrays F[-, -, -] and G[-, -, -] both have values from [0, 0, 0] to [M−1, M−1, M−1].

Next, the CPU sets all elements of the bit array F[-, -, -] to be 1 (step S162).
That is,
$$F[i, j, k] \leftarrow 1$$
is performed for each of an integer i=0, 1, ..., M−1, an integer j=0, 1, ..., M−1 and an integer k=0, 1, ..., M−1. Here, "←" means substitution. In the flow chart, use of "*" denotes that processing is performed for all subscripts within the range (the same applies hereinafter).

Then, the CPU performs the following processing for the N pieces of images of a retrieval result in the order of integers r=1, 2, ..., N (step S163).

First, each element of the bit array G[-, -, -] is set to be 0 (step S164). That is,
$$G[i, j, k] \leftarrow 0$$
is performed for each of an integer i=0, 1, ..., M−1, an integer j=0, 1, ..., M−1, an integer k=0, 1, ..., M−1.

Next, the CPU repeats the following processing for respective pixels contained in the image whose scores of a retrieval result is on the r-th place (step S165).

First, the CPU acquires a color of the pixel (step S166). Hereinafter, for easier understanding, the color of the pixel is represented by (r, g, b) in 24 bit color. That is, r, g, b is any of the integers from 0 to 255.

Then, the CPU finds a segment (i, j, k) in the color space to which the acquired color (r, g, b) belongs (step S167). That is, $$i=(r \times M)/255;$$

$$j=(g \times M)/255;$$

$$k=(b \times M)/255$$

are calculated. Here, multiplication "×" is performed before division "/", and the division is integer division and therefore the reminder is rounded down to an integer.

This calculation converts a color (r, g, b) of a pixel in the image to a color (i, j, k) with a predetermined accuracy. If colors of respective pixels in each image are represented with another accuracy, the above conversion equation only has to be suitably changed according to the accuracy.

After that, the CPU updates a bit value of a bit array G[-, -, -] as follows:
$$G[i, j, k] \leftarrow G[i, j, k] \text{ or } 1$$
(step S168). Here, "or" means bit logical add operation OR.

The CPU repeats processing from step S165 to step S168 for the respective pixels contained in the image whose score of a retrieval result is the r-th place (step S169), and when the repetitions are completed, the CPU performs
$$G[i, j, k] \leftarrow F[i, j, k] \text{ and } G[i, j, k]$$
for each of an integer i=0, 1, ..., M−1, an integer j=0, 1, ..., M−1, and an integer k=0, 1, ..., M−1, (step S170). Here, "and" means bit logical multiply operation AND.

After that, the CPU extracts subscripts (This subscript is a digit sequence corresponding to each segment) whose values are 1 from the bit array G[-, -, -] (step S171), and checks the number of the extracted subscripts (step S172).

If the number of the extracted subscripts is 1 (step S172; =1), the CPT finds a color (r, g, b) in 24 bit color corresponding to a segment (i, j, k) represented by the extracted subscript [i, j, k] (step S173). Calculation is performed in reverse to the calculation in step S167 as follows:

$$r=(i \times 255)/M;$$

$$g=(j \times 255)/M;$$

$$b=(k \times 255)/M$$

Then, the CPU outputs the color (r, g, b) as the determined color (step S164) and terminates this processing.

Meanwhile if the number of the extracted subscript is 0 (step S172; =0), the CPU extracts a subscript whose value is 1 from the bit array F[-, -, -] (step S175). Here, suppose that there are the following L pieces of subscripts whose value is 1 of the bit array F[-, -, -].
$$[i[0], j[0], k[0]], [i[1], j[1], k[1]], \ldots, [i[L-1], j[L-1], k[L-1]]$$

After that, the CPU finds an average color (r, g, b) in 24 bit color of respective segments represented by the extracted subscripts (step S176). Specifically, the following equations are calculated $$r=(\Sigma_{p=0}^{L-1} i[p] \times 255)/(M \times L);$$

$$g=(\Sigma_{p=0}^{L-1} j[p] \times 255)/(M \times L);$$

$$b=(\Sigma_{p=0}^{L-1} k[p] \times 255)/(M \times L)$$

Then, the CPU outputs the color (r, g, b) as the determined color (step S177) and terminates this processing.

It is possible to perform conversion from a color with a low accuracy that is assigned to a segment to a color with a high accuracy that is used to represent an image similarly in aftermentioned embodiments.

In other cases (step S172; =other than 1 and 0), the CPU copies each bit of the bit array G[-, -, -] to the bit array F[-, -, -] (step S178). This is equivalent to performing
$$F[i, j, k] \rightarrow G[i, j, k]$$
for each of an integer i=0, 1, ..., M−1, an integer j=0, 1, ..., M−1, an integer k=0, 1, ..., M−1. Processing can be sped up by employing a copy of the entire bit array and exchange of address of bit arrays indicated by variables F, G.

In this way, the CPU repeats i=0, 1, ..., N−1 (step S179). Termination of these repetitions means that the color cannot be narrowed down to one color, and therefore the CPU advances processing to step S165.

Since in the present embodiment only whether a color appears in each image determines the color indicated by a character string, processing will be sped up and memory consumption should be reduced.

Third Embodiment

The present embodiment employs, as the degree of the color in the above first embodiment, a frequency of the color in images of a retrieval result.

In the present embodiment, the degree acquirer 104, for all pixels contained in N pieces of images of a retrieval result, converts colors of the pixels to colors with a predetermined accuracy and finds segments within the color space. Then, for each segment, the number of pixels having the color belonging to the segment is counted.

In this way, all pixels of all the images of the retrieval result are classified into the respective segments within the color space. The total number of pixels classified into each segment corresponds to the degree of the color of the segment (a color with a predetermined accuracy).

Like the above example, an example will be discussed in which the RGB color space divided into 10×10×10 segments is employed, "green color" is given as a character string indicating a color, and image retrieval is performed on documents in the Internet.

Figure 5:
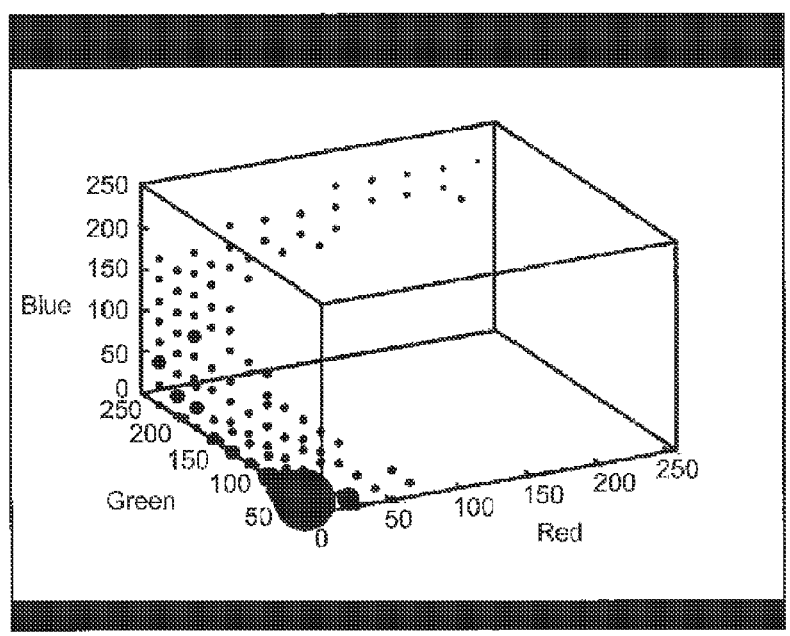
FIG. 5 is a diagram illustrating frequencies at which colors appear in images of a retrieval result.

FIG. 5 is a diagram illustrating frequencies of colors appearing in an image of a retrieval result. Hereinafter, the example will be described with reference to FIG. 5.

FIG. 5 illustrates distribution of frequencies of colors of pixels in the same image as that in FIG. 3A, and sizes of filled circles disposed in the color space vary depending on the number of pixels classified into the respective segments.

The color that appears most frequently in the top one image of a retrieval result (FIG. 5) and the color that appears in common in the top four images of a retrieval result (FIG. 3D) are disposed at almost the same position in the color space.

Accordingly, it is considered that also by using the frequency of a color as a degree, the color indicated by a character string will be determined.

The color determiner 105 selects a segment in which the total number of pixels is the largest from the color space, and then outputs a color of the segment as the color indicated by the character string.

Besides this, a predetermined number of segments (for example, if the total number of segments is 16×16×16=4096, about 10 to 40 segments) may be selected in descending order of the total number of pixels contained therein, and an average color of colors of the respective segments may be outputted as the color indicated by the character string.

In this case, a calculation method of the average color will be a simple average or a weighted average found by using the numbers of pixels of respective segments as weights of the respective segments.

It is also possible to employ the mode in which a predetermined number of segments may be selected in descending order of the total number of pixels contained therein, and colors of the respective segments are outputted as candidates of a plurality of colors indicated by the character string.

In the present embodiment, a color indicated by a character string will be suitably determined on the basis of frequencies of colors of pixels appearing in an image.

Especially, if the frequency of appearance is used as a degree like the present embodiment, the number of images for which frequencies of colors should be counted will be reduced among images obtained as a retrieval result.

For example, as in the case in which degrees of colors (whether the colors appear or not) are determined for about 100 images in the second embodiment, a sufficient result is expected to be obtained by finding degrees of colors (frequencies of appearance of the colors) for about 10 to 20 images in the present embodiment.

It is possible to combine the present embodiment with the second embodiment.

For example, a method will be employed in which repetitions in the second embodiment narrow down the number of candidates of a color indicated by a character string to a certain degree of number, and then frequencies in the present embodiment are used as weights in finding the average color of the candidates.

As a threshold value for narrowing down the candidates, a constant (for example, 10, 20, or the like), or a value obtained by multiplying the total number of segments in the color space with a predetermined number (a value more than 0 and less than 1 such as 0.05 and 0.1) will be employed.

Besides, a value obtained by multiplying the number of colors contained in images at the top to a predetermined ordinal number's place of a retrieval result (the number of segments in which colors are distributed in the color space) with a predetermined number (a value that is greater than 0 and less than 1 such as 0.05 and 0.1) will be employed as a threshold value for narrowing down the candidates.

Besides, a method will be employed in which the present embodiment narrows down colors contained in images at the top to a predetermined ordinal number's place of a retrieval result to colors with higher frequencies, and after that the second embodiment is applied.

In this case, among colors contained in the top image of a retrieval result, colors whose frequencies are higher are set to be 1, and other colors are set to be 0 as an initial value of the bit array F[-, -, -], and after that the above processing in the second embodiment is performed, thereby suitably determining a color at high speed.

Fourth Embodiment

The present embodiment is a variation of the above embodiments for removing unnecessary colors from an image of a retrieval result.

In the above embodiments, colors of all pixels contained in the image of a retrieval result are subjected to processing for calculating degrees.

However, many of the images in the Internet or the like have compositions in which an object having a color of interest is disposed at the center, and around the object is disposed a background having a color different from the color of the object.

Therefore, by removing the color of the background around the object from the calculation of degrees, a color indicated by a character string will be determined more accurately.

Specifically, the degree acquirer 104 performs the following pre-processing.

That is, for each image of a retrieval result, colors of four corners of the image are obtained.

Then, from pixels at the outermost peripheral portion of the image, pixels having the same color as any of the colors of the four corners are removed.

Even if the original image is rectangular, only part of pixels at the outermost peripheral portion are removed in some cases by performing this removal process once. Accordingly, the image after removal is not always rectangular.

Once pixels at the outermost peripheral portion are subjected to removal, pixels adjacent to the removed pixels become pixels at the outermost peripheral portion.

Then, from the pixels at the outermost peripheral portion, pixels having the same color as any of the colors of the four corners are removed again.

This processing is repeated until a pixel having the same color as the colors of the four corners cannot be found at the outermost peripheral portion, and then this processing is terminated.

A pixel to be removed from a peripheral portion of the image is possible to include not only a pixel having the same color as any of the colors of the four corners but also a pixel having a color similar to any of the colors of the four corners.

As a pixel to be compared regarding whether colors are the same or not, a pixel at any of the four corners, for example, at the upper left corner is possibly employed, instead of pixels at the four corners.

In this way, pixels of the background disposed in a peripheral portion of an image are removed from pixels to be processed, and as a result, pixels having a color of interest are preferentially processed, thereby more suitably determining the color indicated by the character string.

Fifth Embodiment

The present embodiment is preferable when image retrieval is performed by an external image retrieval device.

As described above, an image retrieval device using an image retrieval technology, on receiving a character string as a query, returns an image relating to the character string in the Internet as a retrieval result.

Such an image retrieval device is communicably connected via an NIC to a computer that realizes the color determination device 101.

That is, the image retriever 103 transmits an image retrieval request containing a query specifying a character string via an NIC to an external image retrieval device.

Then, the image retrieval device that has received the image retrieval request arranges, as a retrieval result, images that conform to the query among images in the Internet in descending order of scores of a degree of conformance.

Then, the image retrieval device transmits an image retrieval response specifying the retrieval result to the color determination device 101.

The image retriever 103 of the color determination device 101 receives this image retrieval response, and provides, as a result of the image retrieval, images specified by the image retrieval response to the degree acquirer 104.

In this way, the present invention suitably uses an existing image retrieval technology thereby to reduce implementation cost.

Many of such image retrieval devices are possible to specify a retrieval language.

Meanwhile, in some cases, as a character string indicating a color, a name of an object having the color is employed. A character string indicating a color is often part of a proper noun such as the name of a person and name of an organization.

In this case, an image that is not necessarily suitable for determining a color possibly becomes a retrieval result.

Therefore, in the present embodiment, such a problem should be prevented by specifying not only a received character string but also a character string indicating color in the language of the received character string in a query.

Methods to determine the language of a received character string include various modes, such as using the language that is being used by the user, estimating the language from a character code of characters contained in a character string and the user's directly specifying the language.

For example, if UTF-8 is employed as a character code of a character string, the language of the character string will be estimated by examining to what country's characters the character code of the characters is assigned.

If a character string is inputted via a browser, the language of the character string will be estimated from information of what language is used for an input form that is being displayed in the browser or what language is used as a default language or font in the browser.

For example, suppose that a character string of "midori (みどり)" is received. "midori" indicates a color, and also is popular as a Japanese female name. Accordingly, a result of the image retrieval includes many pictures of women whose name is "midori."

As a result, the images have pale orange (skin color), brown, black (hair color), and therefore a color indicated by "midori" cannot be suitably estimated.

Therefore, a character string "iro (色)" meaning color in Japanese, which is the language of the character string "midori", is added to the retrieval query. Then, an image that conforms to both of "midori" and "iro" becomes the retrieval result.

An English word "pink" is used as part of an organizational name of an artist and an artist's name in some cases, like "midori."

A character string "color" meaning color in English, which is the language of "pink", is added to the retrieval query. Then, an image that conforms to both "pink" and "color" becomes the retrieval result.

In this way, in the present mode, by adding not only a received character string but also a character string "iro" "color" or the like that means color to a query, a color corresponding to the character string will be determined more accurately.

Sixth Embodiment

In the above embodiments, once a character string is provided, a color indicated by the character string is determined, thereby obtaining a correspondence relationship between the character string and the color.

In the present embodiment, once a color is provided, a character string indicating the color is determined, thereby obtaining a correspondence relationship between the character string and the color, which works in an opposite way of the color determination device 101.

Figure 6:
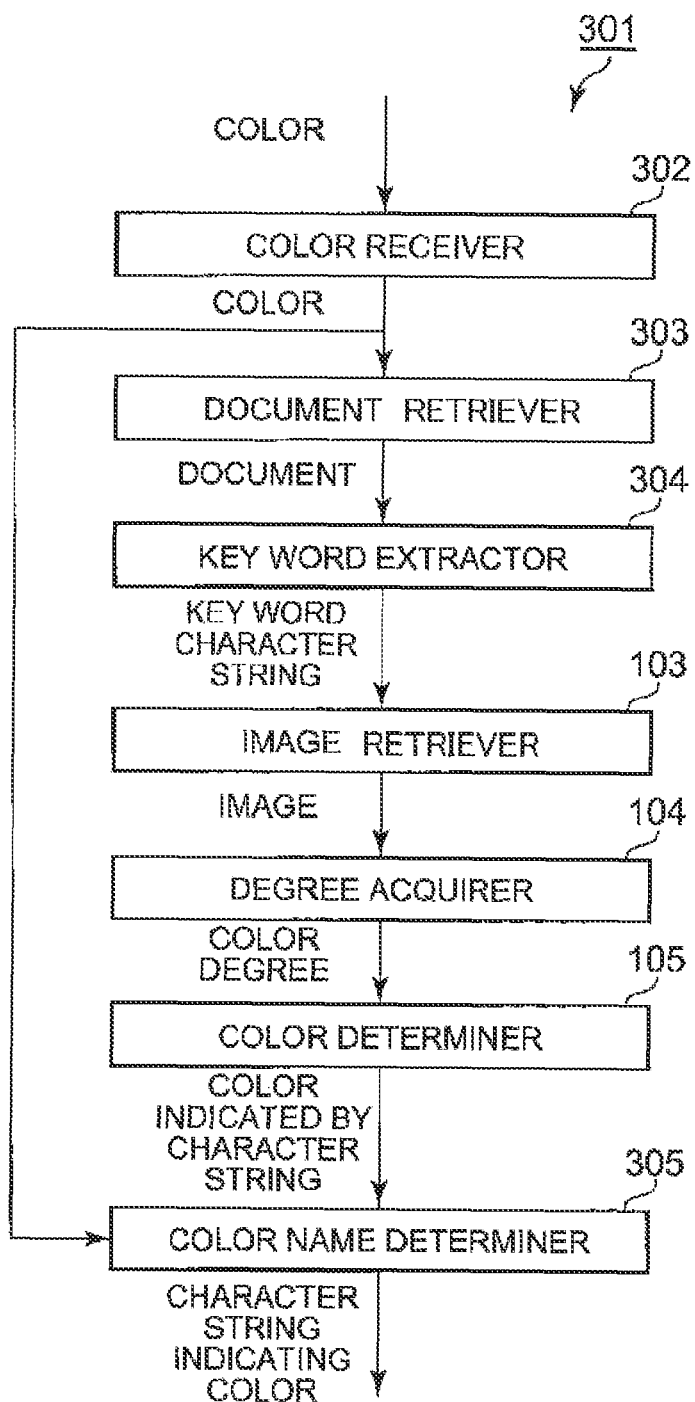
FIG. 6 is a diagram illustrating a schematic configuration of a color name determination device.
Figure 7:
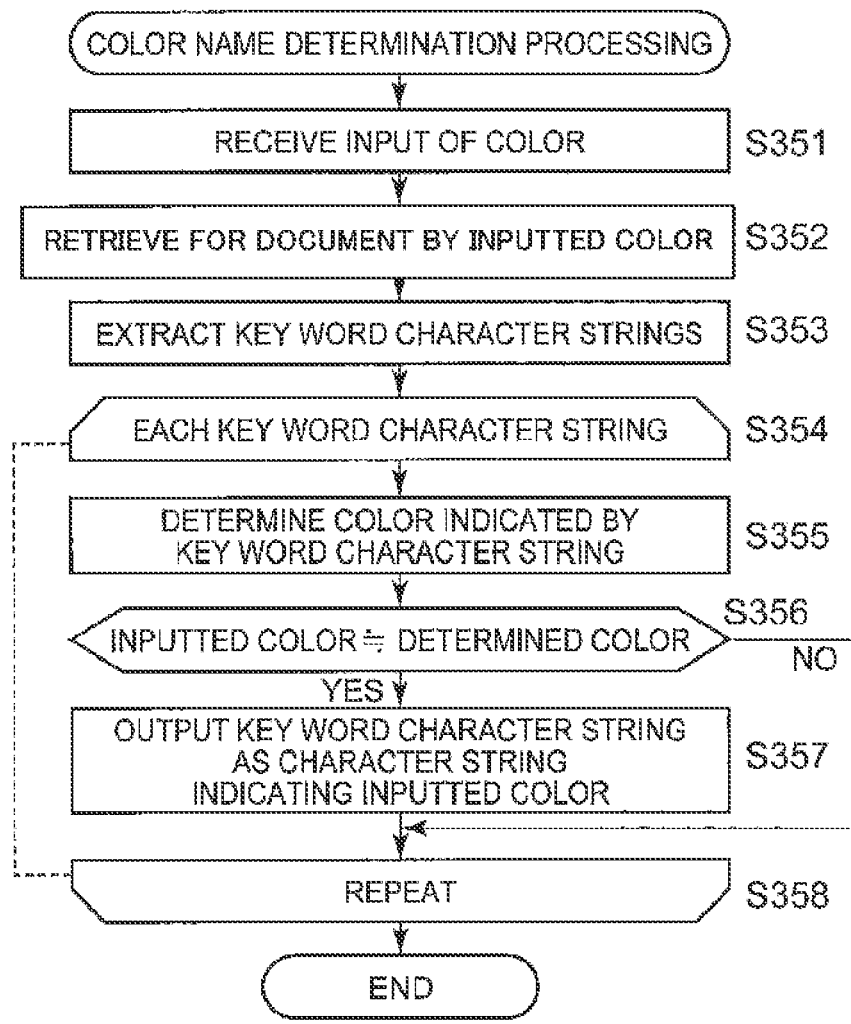
FIG. 7 is a flow chart illustrating color name determination processing that is performed by the color name determination device.

FIG. 6 is a diagram illustrating a schematic configuration of a color name determination device according to the present embodiment. FIG. 7 is a flow chart illustrating color name determination processing performed by the color name determination device. Hereinafter, the present embodiment will be described with reference to these FIGS.

As illustrated in FIG. 6, a color name determination device 301 includes a color receiver 302, a document retriever 303, a key word extractor 304 and a color name determiner 305, as well as the image retriever 103, degree acquirer 104 and color determiner 105 in the aforementioned color determination device 101.

These components are typically realized in such a way that the program is executed on a computer, as described above.

Once the color name determination device 301 starts color name determination processing, the color receiver 302 receives input of a color (step S351).

The color receiver 302 receives a color in the following modes, for example.

(1) A user directly inputs a value of a color component in a color space such as an RGB value and an HSV value.
(2) A user points to a specific pixel in an image. Then, the pixel is received. It is possible to use any image. An image of a color sample, for example, is employed in which various colors are gradationally represented.
(3) When a user specifies an image, a representative color of the image is received. For example, after pixels of background of a specified image are removed by the technology in the fourth embodiment, an average color of the remaining pixels is used as a representative color.

Then, the document retriever 303 retrieves for a document having an image relating to the received color disposed therein (step S352).

As described above, image retrieval technologies include an image retrieval technology in which once a color is specified, an image containing the color is retrieved for. An image retrieval device that realizes such an image retrieval based on a color, like an image retrieval device that realizes an image retrieval based on a character string, will be realized in such a way that a computer itself that realizes the color name determination device 301 executes a program, or will be realized by another computer communicably connected via an NIC.

Next, the key word extractor 304 extracts a key word character string relating to the retrieved document (step S353).

It is the simplest to extract a key word character string from character strings appearing in the retrieved document. A key word character string will be also extracted from information that is not included but related to the retrieved document, such as a comment, a tag, and a caption that are externally added to the retrieved document or an image disposed in the retrieved document.

Here, it is preferable to extract, as a key word character string, a word or a word string such as a noun, a noun phrase, an adjective and an adjective phrase; for example, character strings indicating a noun and a pronoun, as well as adjectives that modify a noun and a pronoun in Japanese.

It is also possible that the text of the retrieved document are divided into words, and the respective words will be employed as key word character strings.

As a character string appearing in the retrieved document, a character string directly viewable by a user when the user is browsing the retrieved document will be employed. A character string that is not directly viewable by the user, such as a character string of an annotation, a tag, a comment or all attributes that are attached to an image in the retrieved document, will be employed.

After that, the color name determination device 301 repeats the following processing for the respective extracted key word character strings (step S354).

That is, the image retriever 103 retrieves for an image relating to the key word character string, and obtains a plurality of images as a result of the image retrieval. The degree acquirer 104 represents colors appearing in the plurality of respective images with a predetermined accuracy, acquires degrees at which the colors represented with the predetermined accuracy appear in the plurality of respective images. Then, the color determiner 105 determines a color indicated by the received character string among the colors represented with the predetermined accuracy, on the basis of the acquired degrees (step S355).

That is, the same processing as processing in which a key word character string is received in color determination processing in the above embodiments is performed.

Then, for a key word character string that is being processed in the current repetition, a color indicated by the key word character string is determined.

Then, the color name determiner 305 determines whether the color that is determined (determined color) and the received color (inputted color) are the same, similar or not (step S356).

Criteria for determining whether colors are the same, similar or not similar will be defined by the distance in the color space, as described above.

If the colors are the same or similar (step S356; Yes), a key word character string that is being processed in the current repetition is determined to be a candidate of the color name character string indicating the received color and is outputted (step S357), and processing at and after step S354 is repeated (step S358).

Meanwhile, if the colors are not the same or similar (step S356; No), processing at and after step S354 is repeated (step S358).

In this way, in determining a character string of a color name indicating a target color, a candidate color is determined from a candidate key word character string, and if the target color and the candidate color is the same or similar, the key word character string is considered to indicate the target color.

If the target color and the candidate color are not the same or similar, a key word extracted from the document of a retrieval result is considered to be a common general word and not to indicate the target color.

In this way, when repetitions are completed for the respective extracted key word character strings (step S354 to step S357), this processing is terminated.

In this way, in the present embodiment, the key word extractor 304 extracts one or more key word character strings, and each of the extracted key word character strings is subjected to an image retrieval by the image retriever 103, an acquisition of a decree by the degree acquirer 104, a determination of a color by the color determiner 105, and a determination of a color name candidate by the color name determiner 305.

As described above, the color name determination device 301 according to the present embodiment applies image retrieval technology to a color received from a user or the like thereby to provide respective key word character strings contained in obtained documents to the aforementioned color determination device 101, and determines a suitable color name indicating the color received from the user or the like from the key word character strings on the basis of whether the obtained color and the color received from the user or the like is similar or not.

In the present embodiment, a plurality of key word character strings are generally outputted as character string candidates indicating a color.

Hereinafter, various modes such as preferred embodiments and variations of the color name determination device 301 according to the present embodiment will be described.

Seventh Embodiment

The present embodiment relates to a preferred embodiment for narrowing down key word character strings.

That is, in the sixth embodiment, the document retriever 303 has a plurality of documents as a retrieval result.

As described above, since a plurality of retrieval results are obtained in descending order of degree of conformance to a query in a common retrieval technology, a predetermined number of documents whose degree of conformance to a provided color are higher are obtained as a retrieval result in the present embodiment.

Then, the key word extractor 304 extracts a key word character string appearing in common in the plurality of retrieved documents.

It is generally considered that in documents obtained as a retrieval result for the same query, a character string whose degree of conformance to the query is high appears a plurality of times. Accordingly, a word or a word string that appears in the respective documents of a retrieval result, as a key word character string candidate;

(1) a frequency of appearance of the candidate in all documents of a retrieval result is obtained, and the candidate with a high frequency is extracted as a key word character string;

(2) the numbers of documents in which the candidate appears in all documents of a retrieval result is obtained, and the candidate with a high number is extracted as a key word character string; and (3) an evaluation value is obtained by combining the above (1) and (2), and the candidate with a high evaluation value is extracted as a key word character string. For example, a linear sum of a frequency and a number with a predetermined coefficient will be used as an evaluation value.

Repetitions based on a key word character string in the sixth embodiment (step S354 to step S357) will be configured such that key word character strings are processed in descending order of the score such as the frequency of appearance, the number of documents in which a key word character string appears and an evaluation value, and once a predetermined upper limit number of key word character strings are determined as character string candidates indicating a color and outputted, repetitions are stopped.

In this method, by setting a predetermined upper limit number to be 1, only one character string indicating a color is determined.

In this method, key word character strings are extracted and processed in descending order of possibility indicating a target color, thereby determining a desired number of character string candidates of a color name at high speed.

Embodiment 8

The present embodiment specifies the language of a character string indicating a color in the aforementioned color name determination device 301.

In the color determination device 101, the language that is used by a user is obtained from a character code of a received character string, the language of an input form displayed in a browser for receiving a character string, and the default language or the language used as a default font in a browser.

Meanwhile, it is information of a color itself that is inputted in the color name determination device 301, and it is difficult to extract information of language from the color itself.

Accordingly, in the present embodiment, a language expressly specified by a user or a language implicitly specified by a user such as the language of an input form displayed in a browser and the default language and the language used as a default font in a browser is employed as the language desired by the user.

The document retriever 303 retrieves a document written in the language specified by the user.

Then, since the resulting retrieved document is written in the language desired by the user, an extracted key word character string and a character string determined to indicate a color name are also in the language desired by the user.

Information obtained as the language desired by the user will be used in color determination processing. That is, in the image retriever 103, a character string meaning a concept of color in the language desired by the user (for example, "iro 色" and "color") is added to a query.

In the present embodiment, a character string indicating a color can be obtained in the language desired by a user. Therefore, a color name unique to a language culture will be obtained, and circumstances unique to the country, language or culture will be dealt with.

Ninth Embodiment

The first embodiment discloses a method in which when a character string indicating a color name is provided, the color determination device 101 determines one color indicated by the color name, and a method in which the color determination device 101 determines one or more colors (see description relating to step S154). If a plurality of colors indicated by a character string is determined in the first embodiment, a predetermined number of colors whose degrees are higher are selected.

The present embodiment applies a clustering technique to determine a plurality of candidates in more detail as a color indicated by a character string, and must output index values indicating degrees of suitability of the respective candidates.

Also in the present embodiment, like the above embodiments, colors of pixels contained in an image of a retrieval result are classified into respective segments (buckets), and the numbers of pixels belonging to the respective segments are totalized.

However, in the present embodiment, clustering processing is performed on color distribution in a three-dimensional color space, thereby selecting a plurality of representative colors. This corresponds to processing of "color subtraction." Accordingly, one or more suitable representative colors are selected by various color subtraction methods using computer graphics.

As a technology applicable to color subtraction, K-means is widely known. In K-means, if
 (a) distribution of colors of pixels, and
 (b) a positive integer k that is the number of division are provided, then
 (x) k pieces of representative colors, and
 (y) strengths of clusters (the number of pixels belonging to the clusters represented by the representative colors, rates of the numbers of pixels classified to the clusters to the total number of classified pixels) are outputted. Considering it as a daily practice, it is suitable that the number of colors indicated by a color name be up to three. In this case, clustering has only to be performed by K means with about three to six values being specified as k.

Besides, there is X-means technology as an algorithm that is an extension of K-means. In X-means, the number of clusters is suitably selected only by providing distribution of colors of pixels, and the number of division, representative colors and strengths of the respective clusters are obtained as a result of clustering.

If, as described above, three colors are selected as colors indicated by a color name, three representative colors whose strengths of clusters obtained are higher are selected. To the selected respective representative colors, should be assigned "strengths of clusters" as a "suitability" index at which the representative colors are indicated by a color name.

It is possible to reduce data using a cut-off point for speeding up clustering calculation and removing colors corresponding to noise. For example, if the original images are 100 pieces, segments containing greater than or equal to 40 pixels are subjected to clustering, and segments containing less than 40 pixels are ignored.

A threshold value for whether to ignore or not must be set on the basis of the number of original images M relative to the total number of segments L and the total number of original pixels G. For example, using a suitable positive constants A, B, if the number of pixels belonging to a segment is less than M/(A×L), the segment is ignored. Or, if the number of pixels belonging to a segment is less than G/(B×L), the segment is ignored. It is possible for the user to specify this threshold value as the user thinks fit.

If the color determination device 101 is provided that outputs one or more colors when one character string indicating a color name is given, it is possible to apply the color determination device 101 to the color name determination device 301.

In this case, for each of the character strings extracted at step S353, one or more colors are determined in the sixth embodiment at step S355. At step S356, it is determined whether each of the determined colors and the color received from the user (an inputted color) at step S351 are the same, similar or not similar. If the colors are similar, a character string corresponding to the determined color is outputted as a candidate of a name of the inputted color.

The clustering technology applicable to the present embodiment is not limited to K-means and X-means. Use of various types of clustering technologies is also included in the technological scope of the present embodiment.

Tenth Embodiment

Hereinafter, an example will be described in which the color determination device 101 and color name determination device 301 according to the above embodiments are applied to on-line sales of products.

That is, a character string to be received by the color determination device 101 is a character string describing a color of a product, and is selected by a manufacturer of the product or a shop owner selling the product.

In this case, a color determined by the color determination device 101 is the representative color of the product.

Information of a representative color of the product will be used by a user of on-line sales in retrieving for a product of the user's preferred color or the like. For example, the user inputs a color and retrieves for a product similar to the color.

Besides, there is a method in which a user selects any of a plurality of predetermined reference colors instead of directly inputting a color, and retrieves for a product of the selected color.

In this case, the color determiner 105 determines a reference color that is most similar to a representative color of a product, among the predetermined reference colors, as a classification color of the product.

In this mode, when a user selects his/her preferred reference color, a product that has a representative color similar to the reference color and has the reference color as a classification color is retrieved for.

Hereinafter, such an application will be more specifically described.

(Product Sales System)

Figure 8:
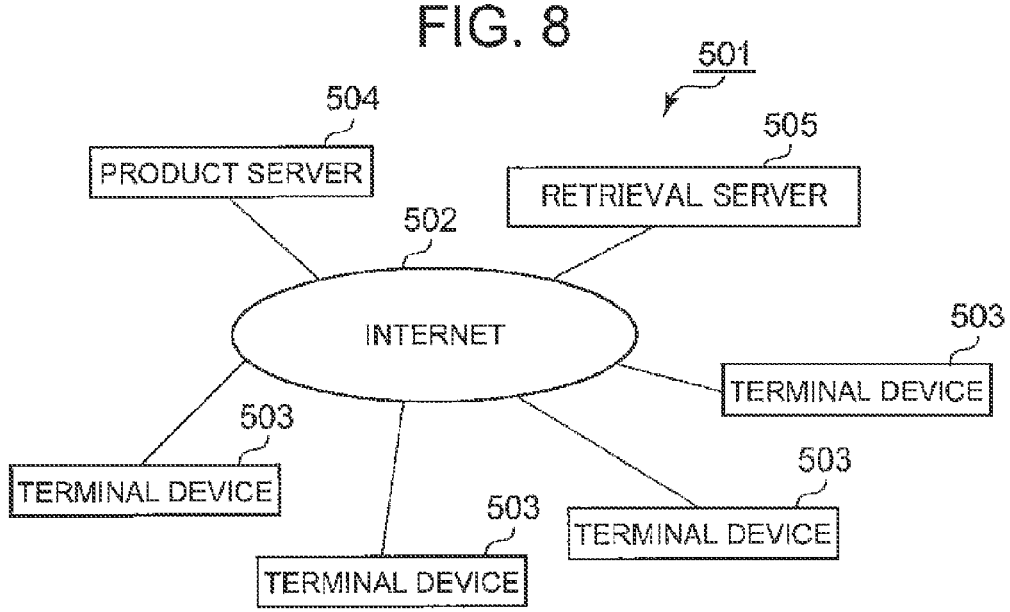
FIG. 8 is a diagram illustrating a schematic configuration of a product sales system.

FIG. 8 is a diagram illustrating a schematic configuration of a product sales system according to the present application. Hereinafter, the product sales system will be described with reference to FIG. 8.

A product sales system 501 illustrated in FIG. 8 is configured in such a way that a terminal devices 503, a product server 504 and a retrieval server 505 are communicably connected to each other via the Internet 502.

Here, the product server 504 is a server device realizing a so-called e-market place.

A shop owner selling a product accesses the product server 504 via a browser that operates on a terminal device 503 used by the shop owner, and registers a product to be sold.

Meanwhile, a purchaser of a product accesses the product server 504 via a browser that operates on a terminal device 503 used by the purchaser, and retrieves for or purchases a product.

The retrieval server 505 corresponds to the image retrieval device in the aforementioned embodiments. When a character string is given, the retrieval server 505 provides an image retrieval function of retrieving for an image relating to the character string, and when a color is given, the retrieval server 505 provides a document retrieval function of retrieving for a document having an image relating to the color disposed therein.

The retrieval server 505 will be realized by a server computer different from the product server 504, or a server computer realizing the product server 504 will also have a function of the retrieval server 505. In the latter case, communication between the product server 504 and the retrieval server 505 should be performed within the server computer not via the Internet 502.

In the present application, the product server 504 according to the aforementioned embodiments executes a predetermined program, thereby realizing the color determination device 101 and color name determination device 301.

(Outline of Product Server)

An administrator of the product server 504 preliminarily selects a plurality of colors as reference colors so that a purchaser can retrieve for a product with the use of a color. Database in the product server 504 is provided with a reference color table for managing these reference colors.

A record registered in the reference color table has the following fields.

(1) Color ID: an identification mark uniquely assigned to each of reference colors preliminarily selected by the administrator of the product server 504 so that the reference colors can be differentiated (2) Color name: a character string that indicates a color name of each of the reference colors and is given by the administrator of the product server 504

(3) Color code: information indicating each of the reference colors in coordinates of a color space, typically RGB representation If the number of colors provided as reference colors is too small, the reference colors are not useful for a purchaser's retrieval, and if too large, it is difficult for a purchaser to select a color in retrieving for a product. The number of colors is typically 8 to 24.

The product server 504 uses a product table provided in the database to manage a product to be sold. A record registered in the product table has the following fields.

(1) Product ID: an identification mark that is uniquely assigned to each product so that products can be differentiated, and in general is automatically created every time a product is registered (2) Product name: name of the product
(3) Brand name: a manufacturer of the product or a guarantor who guarantees quality of the product
(4) Price: a sales price of the product
(5) Original color name: a character string that indicates a color of the product, is given by a shop owner or a manufacturer, and may be a compound word or a newly coined word
(6) Reference color ID: indicating which of preliminarily-set reference colors the color of the product is similar to
(7) Shop owner ID: an identification mark that is uniquely assigned to a shop owner selling the product so that the shop owner can be identified
(8) Product image name: a file name of an image file indicating the product, the image file being able to be registered in the product server 504. If an image file is registered in a web server other than the product server 504, URL (Universal Resource Locator) of the image file is used as a product image name.
(9) Other information relating to the product: various information relating to e-commerce Once reference colors are registered in a reference color table and a reference color of each product is registered in each record of a product table, a user who accesses via a terminal device 503 to the product server 504 will retrieve for and purchase a product by applying a common e-commerce system technology.

Hereinafter, a mode will be described in detail in which various types of information is registered in a product table, and the color determination device 101 and color name determination device 301 are used.

(Registration of Product)

Figure 9A:
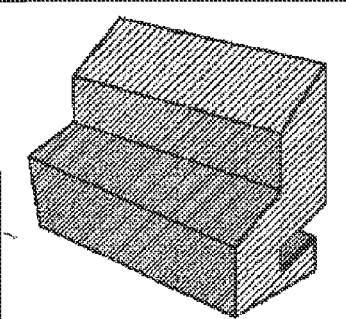
FIG. 9A is a diagram illustrating an example in which a product registration form is displayed on a screen of a terminal device.
Figure 9B:
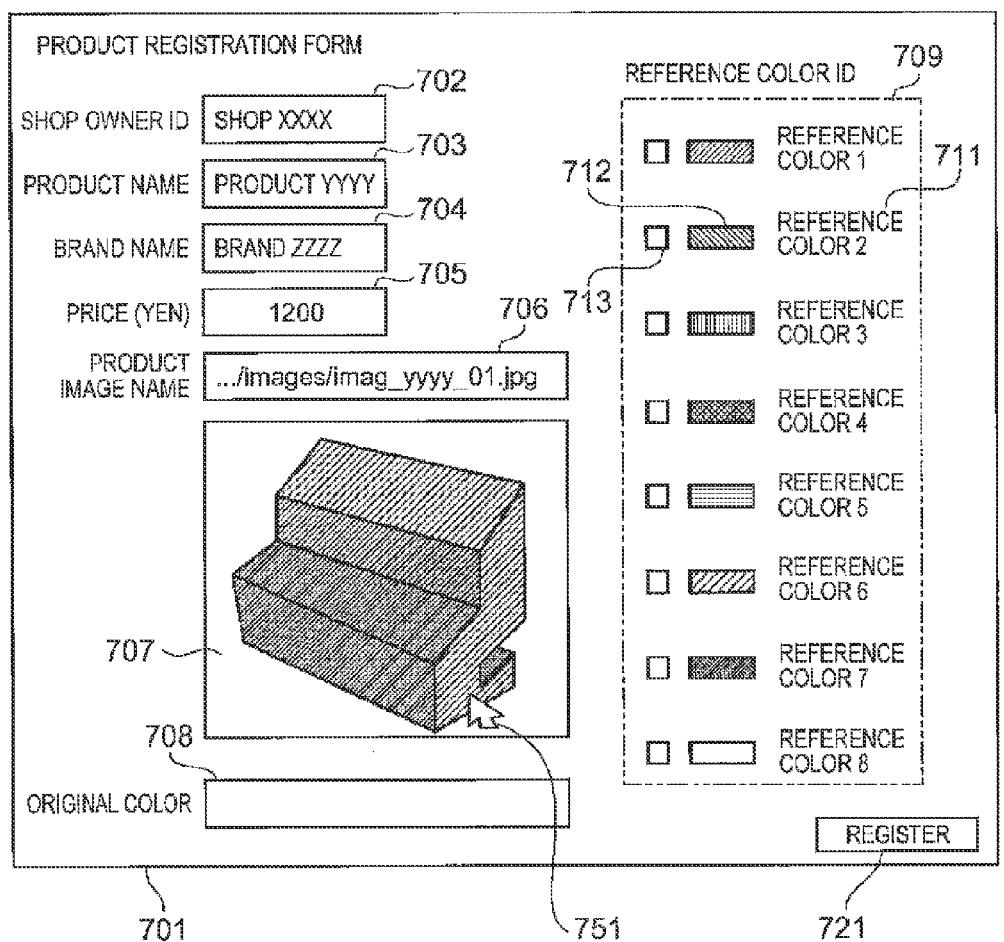
FIG. 9B is a diagram illustrating an example in which a product registration form is displayed on the screen of a terminal device.
Figure 9C:
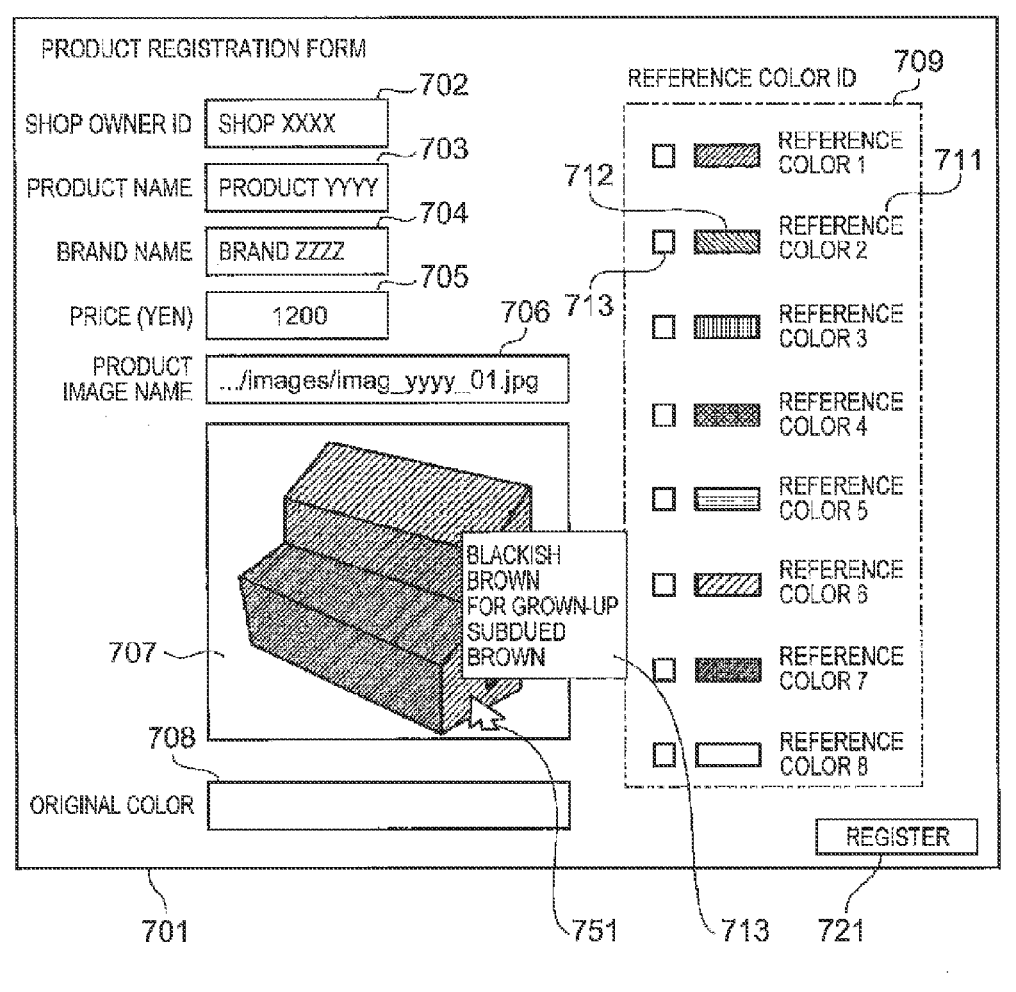

FIGS. 9A, 9B and 9C are diagrams illustrating examples in which a product registration form transmitted from the product server 504 is displayed on the screen of a terminal device 503. Hereinafter, description will be made with reference to FIGS. 9A, 9B and 9C.

A product registration form 701 in these FIGS. includes a shop owner ID field 702, a product name field 703, a brand name field 704, a price field 705 and a product image name field 706, as entry fields for inputting information to be recorded in each field of records of a product table.

Information for these entry fields is inputted in such a way that a shop owner operates a key board and/or a mouse of a terminal device 503.

When a file name or URL of a product image is inputted in the product image field 706, an image file is uploaded to the product server 504 and the product image specified by the file name or URL is displayed in a product image field 707.

A shop owner inputs to an original color name field 708 a character string indicating a color of the product, the character string being made by the shop owner by observing the displayed product image, or being provided by the manufacturer of the product.

A reference color ID field 709 is provided with color names 711 of reference colors, color samples 712 painted with the reference colors, and checkboxes 713 for selecting the reference colors. In FIG. 9A, since no reference color is selected for the product, no checkbox 713 is checked.

When in the terminal devices 503 according to the present application a mouse cursor 751 enters in the product image field 707 of the product registration form 701 as illustrated in FIG. 9B, a color of a pixel pointed by the mouse cursor 751 is acquired and this color is transmitted to the product server 504.

Then, the product server 504 functions as the color name determination device 301 that uses the retrieval server 505 as a document retrieval device, and returns a character string candidate indicating the transmitted color to the terminal device 503.

When the terminal device 503 has received the character string candidate indicating the color, a pop-up window 713 is displayed near the mouse cursor 751 as illustrated in FIG. 9C and the received candidate is displayed in the pop-up window 713.

The shop owner should devise a suitable original color name, by referring to the candidate.

The candidate returned from the product server 504 will include name of a reference color that is the most similar to the color of the pixel specified by the mouse cursor 751.

Figure 9D:
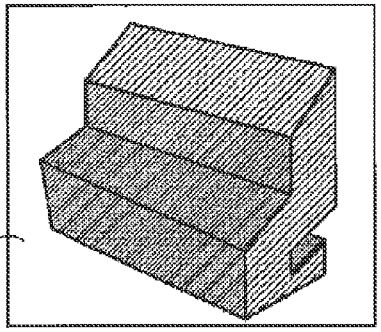
FIG. 9D is a diagram illustrating an example in which a product registration form is displayed on the screen of a terminal device.

When an original color name obtained in such various modes is inputted in the original color name field 708 like in FIG. 9D, the inputted original color name is transmitted to the product server 504 in the present application.

Then, the product server 504 functions as the color determination device 101 that uses the retrieval server 505 as an image retrieval device, and determines a representative color indicated by the transmitted original color name, and a reference color similar to the representative color.

Then, the product server 504 returns a color ID of the determined reference color to the terminal device 503.

Figure 9E:
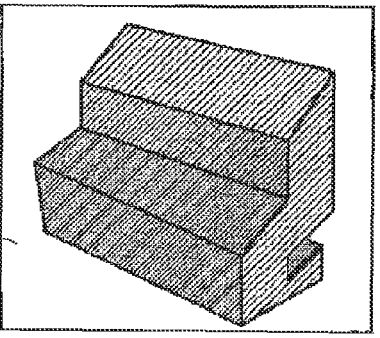
FIG. 9E is a diagram illustrating an example in which a product registration form is displayed on the screen of a terminal device.

The terminal device 503 that has received the color ID changes the mode of display of the color name 711 of a reference color corresponding to the received color ID, a color sample 712 painted with the reference color, a checkbox 713 for selecting the reference color in the reference color ID field 709, thereby highlighting the reference color, as illustrated in FIG. 9E. In FIG. 9E, the color name 711 and color sample 712 that are displayed next to the checkbox 713 are enlarged, thereby highlighting the reference color.

The shop owner selects a reference color most suitable for the product by referring to the highlighted reference color, and checks a checkbox 713 of the selected reference color.

Determination of a reference color by the color determination device 101 might be wrong. In this case, the shop owner will make the right classification by checking a checkbox 713 that is not being highlighted.

However, if determination of a reference color is wrong, it is also considered that selection of an original color name is unsuitable in most cases. In this case, the shop owner will be warned of that effect, and be urged to select an original color name again.

Figure 9F:
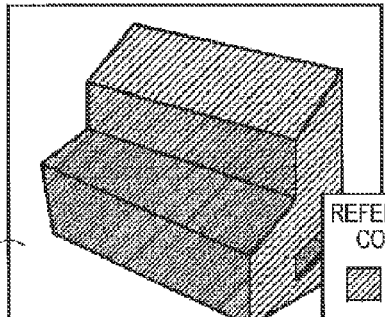
FIG. 9F is a diagram illustrating an example in which a product registration form is displayed on the screen of a terminal device.

Besides, it is possible to limit a selectable color to only a color determined from an original color name. In this case, a mode is possible in which a pop-up window 714 displaying color samples 712 of reference colors is displayed near the original color name field 708 as illustrated in FIG. 9F, and any of the reference colors is selected by the mouse.

Then, when the shop owner uses the mouse to click a registration button 721, each information inputted in the product registration form 701 is transmitted to the product server 504, and is registered as a record of a product table.

In this way, while the product registration form 701 is displayed, communication between the terminal device 503 and the product server 504 is controlled by a script program set in the product registration form 701.

By suitably configuring a script program, a terminal device 503 itself will function as the color determination device 101 or the color name determination device 301. In this case, the aforementioned transmission and receiving of information relating to a color does not need to be performed between the terminal device 503 and the product server 504.

In this way, in the present application, even if a color name that is not known by the product server 504 is specified as an original color name by selection of the shop owner, a reference color that has a high probability to correspond to the original color name can be presented.

(Product Retrieval)

In the present application, to each record of a product table is registered information of a color ID of a reference color that most conforms to a product of the record. Hereinafter, a mode of use of this information will be described.

In a first mode of use, a color ID is used in the retrieval refinement of a product.

Figure 10:
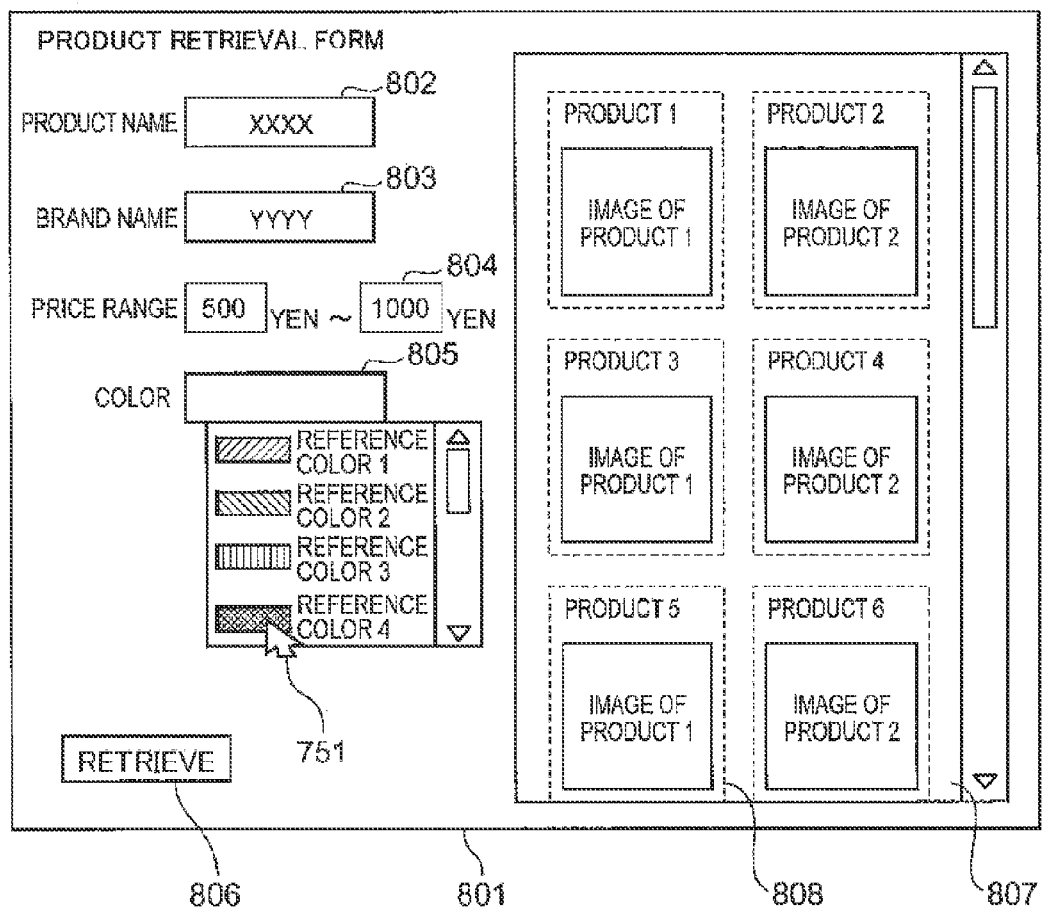
FIG. 10 is a diagram illustrating an example in which a product retrieval form is displayed on the screen of a terminal device.

FIG. 10 is a diagram illustrating an example in which a product retrieval form transmitted from the product server 504 is displayed on the screen of a terminal device 503. Hereinafter, the example will be described with reference to FIG. 10.

As illustrated in FIG. 10, a product retrieval form 801 is provided with a product name key work field 802, a brand name key word field 803, a price range field 804, and a color field 805. When a user fills these fields and clicks a retrieval button 806, a product description 808 is listed as the retrieval result in the retrieval result field 807.

Here, the color field 805 is composed of a drop-down list box in which all reference colors are arranged as selectable colors, and the user can choose a desired color from the reference colors.

In a second form of use, in a webpage for introducing a product are listed the same products in different colors.

Figure 11:
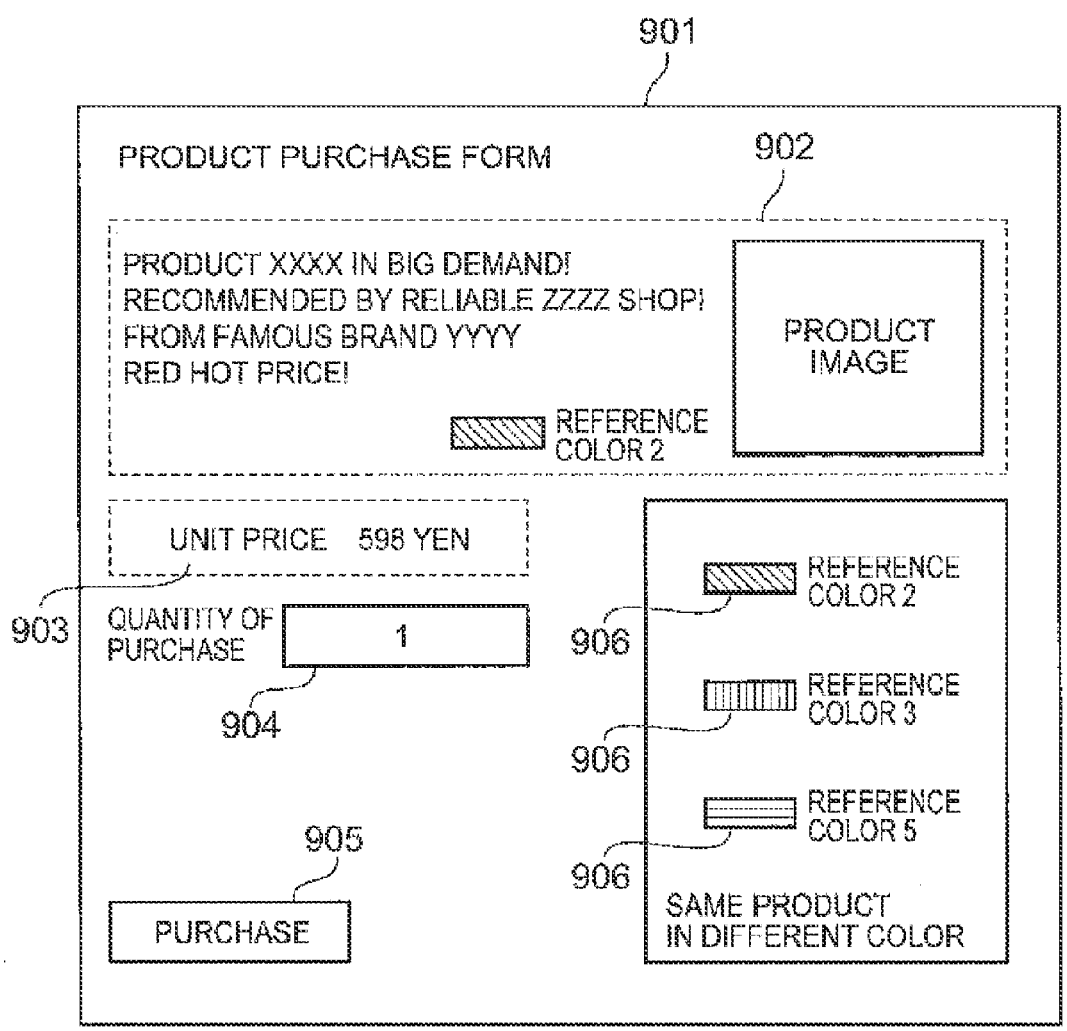
FIG. 11 is a diagram illustrating an example in which a product purchase form is displayed on the screen of a terminal device.

FIG. 11 is a diagram illustrating an example in which a product purchase form transmitted from the product server 504 is displayed on the screen of a terminal device 503. Hereinafter, the example will be described with reference to FIG. 11.

A product purchase form 901 illustrated in FIG. 11 is displayed when the product description 808 as a retrieval result is clicked in the product retrieval form 801.

As illustrated in FIG. 11, the product purchase form 901 is provided with a product description field 902 that displays a product name, a brand name, a description by a shop owner and the like, a price field 903 that displays a product price, a quantity field 904 to which a user inputs quantity of purchase, and a purchase button 905 for starting purchase processing.

Besides, color samples 906 indicate that they are the same products in different colors as the product displayed in the purchase form 901. In a field setting of the aforementioned product table, the same products in different colors mean products whose shop owner, product name and brand name are the same, but whose reference color ID is different.

When a user clicks any of the color samples 906 with a mouse, a browser moves to a product purchase form of the same product in a different color.

In this way, by utilizing the color determination device 101 or color name determination device 301 according to the aforementioned embodiments, a user will use colors in various ways.

In the color determination device 101 and color name determination device 301 according to the aforementioned embodiments, even if an image retrieval device has a low performance, for example, an image retrieval device is used that can provide only one optimal solution for a query, a suitable color and color name are able to be proposed since degrees of appearance of colors have been acquired by using a retrieved plurality of images.

The applicant claims a priority right of the present application on the basis of Japanese Patent Application No. 2011-172210 filed on Aug. 5, 2011, and all of the content of the basic application is hereby incorporated herein by reference as far as the law of the designated state permits.

INDUSTRIAL APPLICABILITY

The present invention provides a color determination device, a color determination system, a color determination method, an information recording medium and a program that are suitable for determining a correspondence relationship between a character string indicating a color and at least one color indicated by the character string.

REFERENCE SIGNS LIST

101 Color determination device
102 Character string receiver
103 Image retriever
104 Degree acquirer
105 Color determiner
301 Color name determination device
302 Color receiver
303 Document retriever
304 Key word extractor
305 Color name determiner
501 Product sales system
502 Internet
503 Terminal device
504 Product server
505 Retrieval server
701 Product registration form
702 Shop owner ID field
703 Product name field
704 Brand name field
705 Price field
706 Product image name field
707 Product image field
708 Original color name field
709 Reference color ID field
711 Color name
712 Color sample
713 Checkbox
714 Pop-up window
721 Registration button
751 Mouse cursor
801 Product retrieval form
802 Product name key word field
803 Brand name key word field
804 Price range field
805 Color field
806 Retrieval button
807 Retrieval result field
808 Product description
901 Product purchase form
902 Product description
903 Price field
904 Quantity field
905 Purchase button
906 Color sample

The invention claimed is:

1. A color determination device comprising
a character string at least one memory storing a program;
at least one processor executing the program that implements: receiver that receives input of a character string;
a degree acquirer that represents, with a predetermined accuracy, one or more colors appearing in each of a plurality of images obtained as a result of retrieving for an image relating to the received character string, and acquires a degree at which the on or more colors represented with the predetermined accuracy appear in each of the plurality of images; and a color determiner that determines a color indicated by the received character string on a basis of the acquired degree, from the one or more colors represented with the predetermined accuracy.

2. The color determination device according to claim 1, wherein
the degree is a value indicating a number of image in which the one or more colors represented with the predetermined accuracy appear, among the plurality of images, and
the color determiner extracts one or more colors having a highest degree from the one or more colors represented with the predetermined accuracy on a basis of the acquired degree, and determines a color indicated by the received character string on a basis of the extracted one or more colors.

3. The color determination device according to claim 2, wherein
the color determiner determines that a color obtained by averaging the extracted one or more colors is a color indicated by the received character string.

4. The color determination device according to claim 1, wherein
the degree is a frequency at which the one or more colors represented with the predetermined accuracy appear in each of the plurality of images, and
the color determiner extracts, on a basis of the acquired degree, one or more colors represented with the predetermined accuracy having a higher total number of the frequency in appearing in each of the plurality of images, and determines a color indicated by the received character string from the one or more extracted colors.

5. The color determination device according to claim 4, wherein
the color determiner determines that a color obtained by averaging the one or more extracted colors using a total number of frequency of the one or more extracted colors as weights is a color indicated by the received character string.

6. The color determination device according to claim 1, wherein
the degree acquirer removes, for each of the plurality images, a pixel having the same color as the pixel at a corner of the image from a peripheral boarder of the image, and then represents a color appearing in the image with the predetermined accuracy.

7. The color determination device according to claim 1, further comprising an image retriever to retrieve for an image relating to the received character string, and
wherein the degree acquirer acquires the degree from the plurality of images obtained as a result of image retrieval by the image retriever.

8. The color determination device according to claim 1, wherein
the color determiner clusters the acquired degree thereby to determine that a representative color of each cluster is a color indicated by the received character string.

9. The color determination device according to claim 1, further comprising an image retriever that transmits an image retrieval request containing a query to specify the received character string to an external image retrieval device communicably connected to the color determination device, receives an image retrieval response in response to the image retrieval request from the image retrieval device, and obtains a plurality of images specified in the image retrieval response as a result of image retrieval, and
wherein the degree acquirer acquires the degree from the plurality of images obtained as the result of the image retrieval by the image retriever.

10. The color determination device according to claim 9, wherein
the image retriever specifies, as the query, a character string meaning color in the language of the received character string, and the received character string.

11. The color determination device according to claim 1, wherein
the received character string is a character string describing a color of a product,
the determined color is a representative color of the product, and
the color determiner determines that, among predetermined reference colors, a reference color that is most similar to the representative color of the product is a classification color of the product.

12. A color determination system comprising: an image retrieval device that, on receiving an image retrieval request containing a query to specify a character string, retrieves for an image that conforms to the query, and transmits an image retrieval response that specifies a plurality of images obtained by the image retrieval; and a color determination device communicably connected to the image retrieval device, the color determination device comprising:
at least one memory storing a program;
at least one processor executing the program that implements:
a character string receiver that receives input of a character string;
an image retriever that transmits an image retrieval request containing a query to specify the received character string to the image retrieval device, receives an image retrieval response in response to the image retrieval request from the image retrieval device, and obtains a plurality of images specified in the image retrieval response as the image retrieval;
a degree acquirer that represents one or more colors, with a predetermined accuracy, that appear in each of the plurality of images obtained as a result of the image retrieval, and acquires a degree at which the one or more colors represented with the predetermined accuracy appear in each of the plurality of images; and
a color determiner that determines a color indicated by the received character string on a basis of the acquired degree, from the one or more colors represented with the predetermined accuracy.

13. A color determination method comprising:
a character string receiving step to receive input of a character string;
a degree acquisition step to represent with a predetermined accuracy, one or more colors that appear in each of a plurality of images obtained as a result of retrieving for an image relating to the received character string, and to acquire a degree at which the one or more colors represented with the predetermined accuracy appear in each of the plurality of images; and
a color determination step to determine a color indicated by the received character string on a basis of the acquired degree, from the one or more colors represented with the predetermined accuracy.

* * * * *